United States Patent [19]
Newby

[11] Patent Number: 5,964,085
[45] Date of Patent: Oct. 12, 1999

[54] SYSTEM AND METHOD FOR GENERATING A GASEOUS FUEL FROM A SOLID FUEL FOR USE IN A GAS TURBINE BASED POWER PLANT

[75] Inventor: Richard Allen Newby, Pittsburgh, Pa.

[73] Assignee: Siemens Westinghouse Power Corporation, Orlando, Fla.

[21] Appl. No.: 09/093,660

[22] Filed: Jun. 8, 1998

[51] Int. Cl.[6] ............................................ F02G 3/00
[52] U.S. Cl. ...................... 60/39.02; 60/39.12; 48/198.3; 55/479; 110/216
[58] Field of Search .............................. 60/39.02, 39.12; 48/198.3; 55/479; 110/216

[56] References Cited

U.S. PATENT DOCUMENTS

| | | | |
|---|---|---|---|
| 4,351,251 | 9/1982 | Brashears | 110/261 |
| 4,413,573 | 11/1983 | Hall et al. | 110/347 |
| 4,552,078 | 11/1985 | Morin et al. | 110/347 |
| 4,660,478 | 4/1987 | Sheppard et al. | 110/264 |
| 4,685,404 | 8/1987 | Sheppard et al. | 110/265 |
| 4,724,780 | 2/1988 | Hoffert et al. | 110/263 |
| 4,788,919 | 12/1988 | Holm et al. | 110/347 |
| 4,955,295 | 9/1990 | Abdulally | 110/263 |
| 4,960,056 | 10/1990 | Pillsbury | 110/233 |
| 4,961,389 | 10/1990 | Pillsbury | 110/233 |
| 5,220,782 | 6/1993 | Brown et al. | 60/39.02 |
| 5,268,019 | 12/1993 | Rathbone | 75/466 |
| 5,388,395 | 2/1995 | Scharpf et al. | 60/39.02 |
| 5,406,786 | 4/1995 | Scharpf et al. | 60/39.05 |
| 5,410,869 | 5/1995 | Muller | 60/39.02 |
| 5,421,166 | 6/1995 | Allam et al. | 62/24 |
| 5,437,150 | 8/1995 | Latham et al. | 60/39.02 |
| 5,540,896 | 7/1996 | Newby | 422/172 |
| 5,582,029 | 12/1996 | Occhialini et al. | 62/636 |
| 5,653,181 | 8/1997 | Yang et al. | 110/216 |
| 5,666,823 | 9/1997 | Smith et al. | 62/646 |

OTHER PUBLICATIONS

R.L. Bannister, et al.; *Development of Direct Coal–Fired Combined Cycle for Commercial Application;* 1992; pp. 1–11.

Primary Examiner—Noah P. Kamen

[57] ABSTRACT

A system and method for generating power by producing a clean gaseous fuel from a solid fuel, such as coal. A flow of oxygen enriched compressed air is formed by combining compressed ambient air from a gas turbine compressor and a flow of oxygen from a air separation unit. The coal is supplied to a gasifier, along with the flow of oxygen enriched compressed air in which the coal is combusted. The gasifier produces a flow of hot gaseous fuel containing slag and other particulate matter. The slag is removed from the hot gaseous fuel and, after processing, forms the bed media for filter that removes particulate matter from the gaseous fuel. The air separation unit also produces a flow of nitrogen. The nitrogen is mixed into the air prior to filtering so as to cool the air. After cooling and cleaning, the gaseous fuel is combusted in the combustor of a gas turbine, thereby generating shaft power.

19 Claims, 4 Drawing Sheets

SYSTEM AND METHOD FOR GENERATING A GASEOUS FUEL FROM A SOLID FUEL FOR USE IN A GAS TURBINE BASED POWER PLANT

BACKGROUND OF THE INVENTION

The present invention relates to generating gaseous fuel from a solid fuel, such as coal, that can be burned in a gas turbine based power plant.

The high efficiency, low capital cost and short lead time of gas turbine based power plants make them particularly attractive to electric utilities as a means of producing electrical power. Unfortunately, traditionally, gas turbines have been limited to operation on expensive, sometimes scarce, fuels - chiefly, distillate oil and natural gas. As a result of the ready availability and low cost of coal, considerable effort has been expended toward developing a gas turbine system for generating electrical power that can utilize coal as its primary fuel.

In one approach, compressed air from the gas turbine compressor is used to partially combust coal in a gasifier to produce a hot, low to medium heating value fuel gas. This hot fuel gas is combusted and then expanded in the turbine section of the gas turbine, which produces useful shaft power. Unfortunately, such systems can result in unacceptable emissions, especially in terms of particulate, sulfur and alkali emissions, unless prohibitively expensive clean-up measures are employed. In addition, the heating value of the fuel produced by the gasifier is lower than desired.

It is therefore desirable to provide a system and method for effectively producing a clean gaseous fuel, which can be burned in a gas turbine combustor, from a solid fuel, such as coal.

SUMMARY OF THE INVENTION

Accordingly, it is the general object of the current invention to provide a system and method for effectively producing a clean gaseous fuel, which can be burned in a gas turbine combustor, from a solid fuel.

Briefly, this object, as well as other objects of the current invention, is accomplished in a method of generating a gaseous fuel from a solid fuel, comprising the steps of (i) compressing a first flow of air so as to produce a flow of compressed air, (ii) separating a second flow of air into at least a flow of nitrogen and a flow of oxygen, (iii) combining the flow of compressed air and the flow of oxygen so as to produce a flow of oxygen enriched air, (iv) directing the flow of oxygen enriched air to a gasifier and combusting the solid fuel therein so as to produce a flow of hot gaseous fuel containing particulate matter, (v) cooling the flow of hot gaseous fuel by transferring heat from the flow of hot gaseous fuel to at least a portion of the flow of nitrogen so as to produce a flow of cooled gaseous fuel, and (vi) directing the cooled gaseous fuel to a filter and removing a substantial portion of the particulate matter therefrom so as to produce a flow of cleaned cooled gaseous fuel.

In a preferred embodiment of the method, the flow of hot gaseous fuel produced in the gasifier contains slag, and the method further comprises the steps of (i) separating a substantial portion of the slag from the hot gaseous fuel, and (ii) directing at least a portion of the slag separated from the hot gaseous fuel to the filter. In this embodiment, the particulate matter is removed from the hot gaseous fuel by flowing the hot gaseous fuel through a bed media formed by the slag. Further, in this embodiment, the step of transferring heat from the flow of hot gaseous fuel comprises mixing at least the portion of the flow of nitrogen into the flow of hot gaseous fuel.

The current invention also encompasses system for generating a gaseous fuel from a solid fuel, comprising (i) a compressor for compressing a first flow of air so as to produce a flow of compressed air, (ii) an oxygen separation unit for separating a second flow of air into at least a flow of nitrogen and a flow of oxygen, (iii) a gasifier for combusting the solid fuel in a combined flow of the compressed air and the oxygen so as to produce a flow of hot gaseous fuel containing particulate matter, (iv) a cooler for cooling the flow of hot gaseous fuel by transferring heat from the flow of hot gaseous fuel to at least a portion of the flow of nitrogen so as to produce a flow of cooled gaseous fuel, and (v) a filter connected to receive the cooled gaseous fuel from the cooler, the filter having means for removing a substantial portion of the particulate matter from the cooled gaseous fuel so as to produce a flow of cleaned cooled gaseous fuel.

DESCRIPTION OF THE PREFERRED EMBODIMENT

Figure 1:
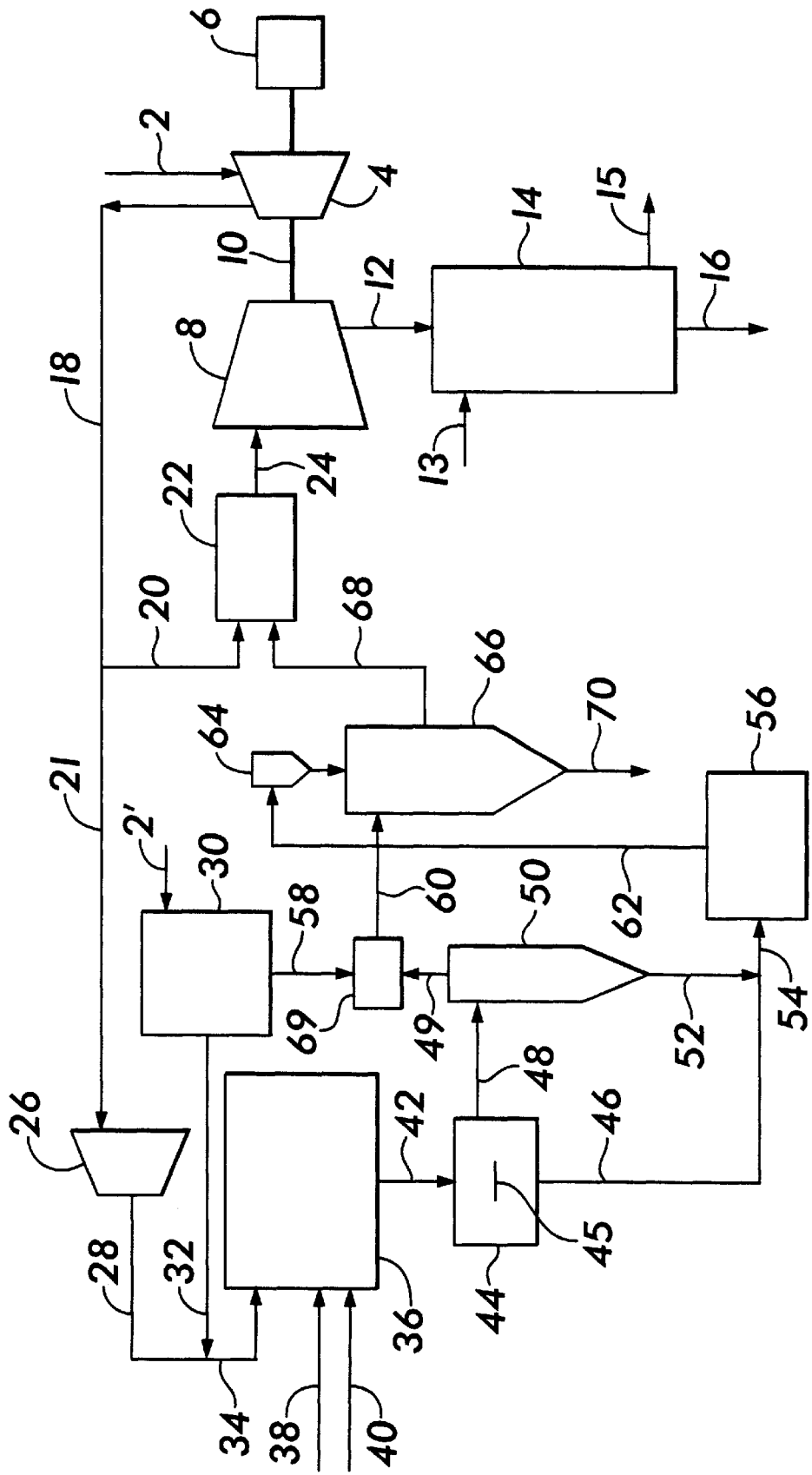
FIG. 1 is a schematic diagram of a solid fuel gas turbine based power plant according to the current invention.

Referring to the drawings, there is shown in FIG. 1 schematic diagram of a solid fuel gas turbine based power plant according to the current invention. As is conventional in gas turbine based power plants, ambient air 2 is inducted into a gas turbine compressor 4, which may be of the axial flow type. The compressed air 18 discharged by the compressor 4 is split into two streams 20 and 21. Stream 20 is directed to a gas turbine combustor 22, which may be comprised of a plurality of combustor baskets. A gaseous fuel 68, discussed further below, is also directed to the combustor 22 and is combusted therein in the compressed air 20, thereby producing hot combustion gas 24. The hot combustion gas 24 is directed to a turbine 8 where it is expanded, producing shaft power in a rotor 10. The rotor 10 drives the compressor 4 as well as an electrical generator 6, thereby producing electrical power. The expanded and partially cooled exhaust gas 12 from the turbine 8 is directed through a heat recovery steam generator 14, where a portion of the heat in the exhaust gas is transferred to feed water 13 so as to generate steam 15. The steam 15 can be expanded in a steam turbine (not shown), thereby producing additional shaft power. The exhaust gas 16 from the heat recovered steam generator 14 is discharged to atmosphere.

The current invention concerns a system and method for converting a solid fuel 38, such as coal, into the gaseous fuel 68 that is combusted in the combustor 22. Accordingly, the second stream of compressed air 21 from the gas turbine compressor 4 is directed to a boost compressor 26 so as to produce further pressurized air 28. Additional ambient air 2' is supplied to an air separation unit 30 where it is separated into at least a flow of oxygen 32 and a flow of nitrogen 58. As is well known in the art, various methods may be employed to separate air into oxygen and nitrogen, such as membrane or adsorption methods, as well as the use of cryogenic distillation columns. Preferably, according to the current invention, sufficient oxygen 32 is introduced into the compressed air 28 from the boost compressor 26 so that the resulting flow of oxygen enriched air 34 has an oxygen content of about 40% by volume, as compared with about 21% for ambient air.

The enriched air 34, along with a flow of a solid fuel 38, such as coal, is directed to a gasifier 36. In addition to coal, other solid fuels, such as biomass or other alternative fuels could also be utilized. A sulfur sorbent 40, which may be calcium-based or iron-based, is also directed to the gasifier 36 to enable in situ sulfur removal. Using principles well known in the art, the gasifier 36 combusts the coal 38 and produces a fuel gas 42 that is laden with particulates, chiefly coal slag, ash and spent sorbent. To achieve adequate gasification, the gasifier 36 must be operated above a minimum temperature. In addition, operation at temperatures below about 1420° C. (2600° F.) will result in excessive slag build-up on the interior surfaces of the gasifier 36 that will harm overall system thermal efficiency and hamper the combustion reaction by reducing flame temperature.

Figure 2:
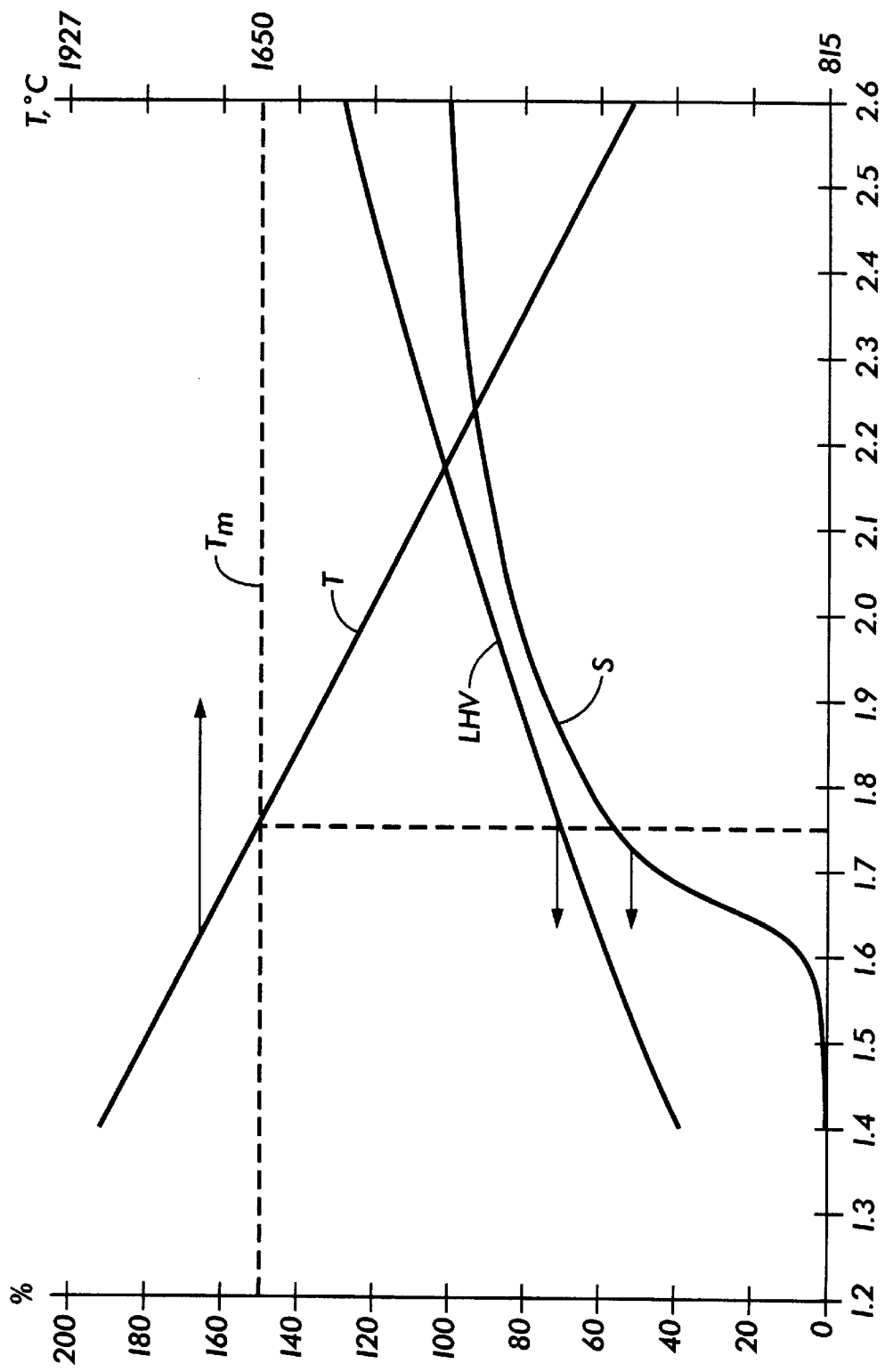
FIG. 2 is a graph of gasifier temperature, T, and percentage sulfur removal, S, and fuel low heating value, LHV, versus the gasifier equivalence ratio when the gasifier is operated on ambient air.

According to the current invention, the use of oxygen enriched air 34 in the gasifier 36 improves sulfur removal and increases the heating value of the gaseous fuel 42. FIG. 2 is graph of estimated gasifier performance when the gasifier is operated on compressed ambient air. The performance is shown in terms of three variables—(i) the sulfur removal efficiency in percent, S, (ii) the temperature of hot gaseous fuel 42 produced by the gasifier, T, and (iii) the lower heating value, LHV, of the hot gaseous fuel. Sulfur removal is shown on the left axis in percent. The cold fuel low heating value is also shown on the left axis in BTU/SCF. The temperature of the gaseous fuel 42 is show on the right axis in degrees centigrade. These parameters are plotted versus the equivalence ratio, which is defined as the ratio obtained by dividing the stoichiometric air-to-fuel ratio by the actual air-to-fuel ratio (or the actual enriched-air-to-fuel ratio in the case of FIG. 3, discussed below). The minimum gasifier temperature, $T_{min}$, which is approximately 1650° C. (3000° F.) under the operating conditions associated with FIG. 2, is also indicated. As can be seen from FIG. 2, when using compressed ambient air, the maximum permissible equivalence ratio, in order to avoid reducing the temperature below the minimum value, is about 1.75, at which point the sulfur removal efficiency is only about 50% and the gaseous fuel low heating value is only about 70 BTU/SCF.

Figure 3:
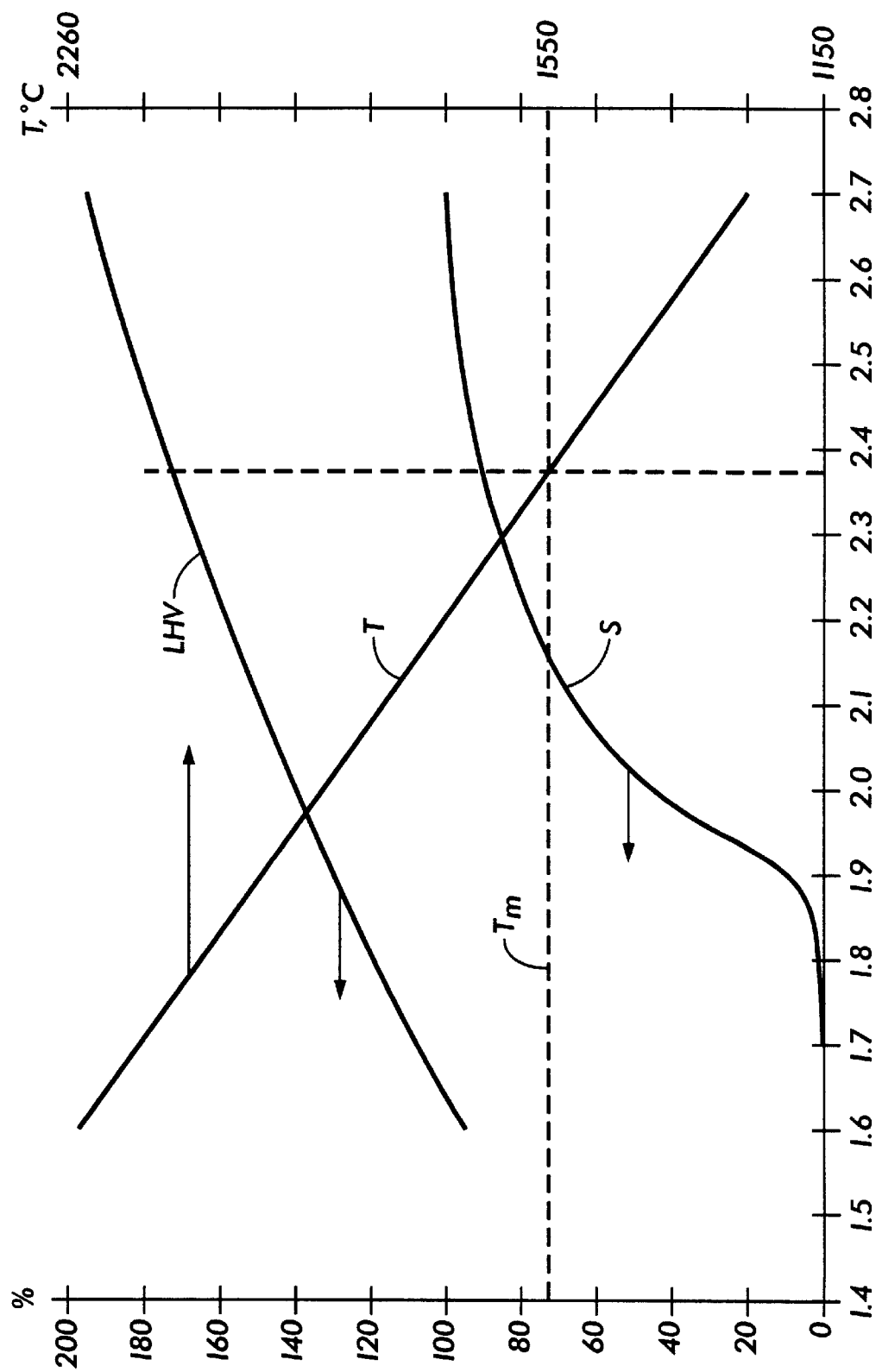
FIG. 3 is a graph similar to FIG. 2 but showing the gasifier performance when it is operated on oxygen enriched air according to the current invention.

By contrast, FIG. 3 is a graph of the same parameters when the gasifier is operated on oxygen enriched compressed air in which the volumetric percentage of oxygen has been increased to about 40%. The minimum permissible temperature, $T_{min}$, has decreased to about 1550° C. (2800° F.) due to improved carbon conversion when using oxygen enriched air. Moreover, the maximum permissible equivalence ratio at $T_{min}$ has been increased to about 2.35, at which point the sulfur removal efficiency has increased to about 90% and the low heating value of the gaseous fuel has increased to about 170 BTU/SCF. As can be seen, the use of oxygen enriched combustion air in the gasifier 36 significantly improves the performance of the gasifier 36.

Returning to FIG. 1, the hot gaseous fuel 42 from the gasifier 36 is directed to first and second stage slag separators 44 and 50, respectively, which may be of the types shown in U.S. Pat. No. 4,961,389 (Pillsbury), hereby incorporated by reference in its entirety. The first stage slag separator is preferably of the impact type, in which the hot gaseous fuel 42 is accelerated through a nozzle and directed at a collector plate 45 oriented approximately perpendicularly to the gas flow. Agglomerates of slag that are too large to follow the gas stream-lines around the collector plate 45 impinge on it and are separated from the gas stream. The separated slag 46 flows down the collector plate 45, while the gaseous fuel 48 exits above the collector plate. Preferably the impact separator 44 removes about 90% of the slag. The gaseous fuel 48 from the impact separator 44 is then directed to a cyclone separator 50 in which a substantial portion 52 of the remaining slag is removed by cycloning the gaseous fuel.

From the first and second stage slag separator 44 and 50, the hot gaseous fuel 49 is cleaned. Cleaning can be accomplished by directing the hot gaseous fuel 49 to a hot gas cleanup system, such as that disclosed in U.S. Pat. No. 5,540,896 (Newby), hereby incorporated by reference in its entirety. However, according to the current invention, prior to cleaning, the hot gaseous fuel 49 is first cooled. Cooling the gaseous fuel prior to cleaning facilitates removal of particulates and alkali. It also simplifies the design of the cleaning system components and allows the use of less expensive materials. As shown in FIG. 1, according to the current invention, the cooling is preferably accomplished by directing the gaseous fuel 49 to a mixer 69 in which it is mixed with the nitrogen 58 produced by the air separation unit 30. As a result of this mixing, heat is transferred from the gaseous fuel 49 to the nitrogen 58. Consequently, the mixer 69 produces cooled gaseous fuel 60. Preferably, sufficient nitrogen is introduced into the gaseous fuel 60 to reduce its temperature to not more than about 760° C. (1400° F.). From the mixer 69, the cooled gaseous fuel 60 is then directed to a filter 66 for removal of particulate matter. While the filter 66 could employ any bed media known in the art, according to the current invention, preferably, the filter incorporates a bed media comprised of slag 62 from the slag separators 44 and 50, as discussed below.

The flows of slag 46 and 52 from the first and second stage slag separators 44 and 50, which are in a molten state, are combined and the combined slag flow 54 is directed to a slag processing unit 56. In the slag processing unit 56, the molten slag 54 is first water-quenched by spraying water over the molten slag 54. This cools the slag until it is substantially solid pieces that are dropped into a water bath. After dewatering, the slag pieces 62 are directed to a filter 66, via a hopper 64. Since the filter 66 operates best using slag pieces of at least about ½ cm (¼ inch) in diameter, the slag pieces may be separated by size in the processing unit 56, for example by screening, so that only the pieces larger than ½ cm are supplied to the filter 66. Alternatively, the slag processing unit 56 could also incorporate a pelletizer that, using techniques well known in the art, forms the slag pieces into pellets of acceptable size.

Figure 4:
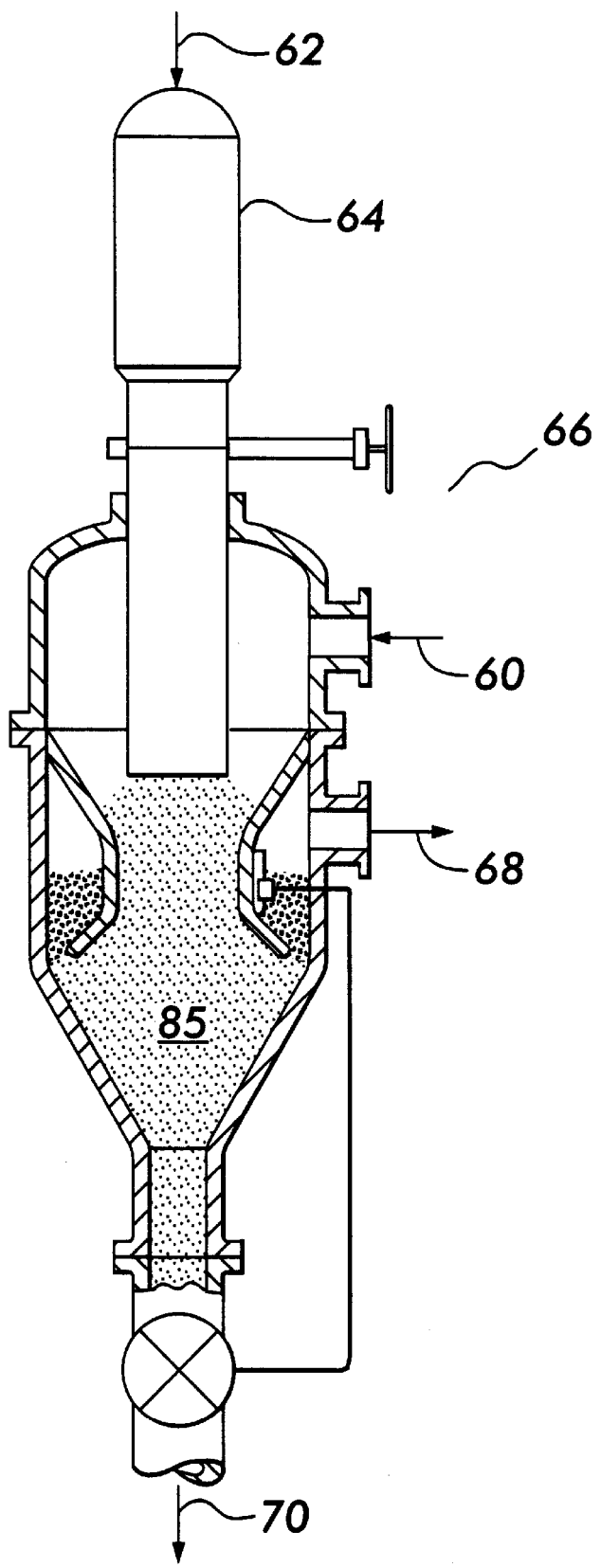
FIG. 4 is a cross-section through the filter shown in FIG. 1.

The filter 66, shown in FIG. 4, is preferably of the standleg moving granular bed type, such as that disclosed in U.S. Pat. No. 5,653,181 (Yang et al.), hereby incorporated by reference in its entirety. As shown in FIG. 4, the slag pieces 62 form the bed 85 for the filter 66. As the gaseous fuel 60 flows through the bed 85, particulate matter is removed and alkali vapor is condensed. Preferably, the slag pieces 62 are transported to the hopper 64 at the top of the filter 66 and are then fed by gravity through the filter vessel. When operated according to the principles of the current invention, the mass ratio of the media bed to the ash particles in the gaseous fuel 60 is very large, resulting in very efficient removal of flyash and other particulate matter at very low pressure drop. The bed media, captured flyash and other particulate matter 70 are drained from the filter 66 and disposed of.

As shown in FIG. 1, from the filter 66, the now clean, partially cooled gaseous fuel 68 is directed to the combustor 22 and burned, allowing the generation of power in the turbine 8, previously discussed.

As can be readily appreciated from the foregoing, the current invention results in improved gasifier performance, especially increased sulfur removal and fuel low heating value, by enriching the oxygen content of the combustion air. The current invention also results in improved filter performance by using the nitrogen from the air separation unit to efficiently cool the hot gaseous fuel prior to filtering and by using the slag from the gasifier as the bed media for the filter.

The present invention may be embodied in other specific forms without departing from the spirit or essential attributes thereof and, accordingly, reference should be made to the appended claims, rather than to the foregoing specification, as indicating the scope of the invention.

I claim:

1. A method of generating a gaseous fuel from a solid fuel, comprising the steps of:
    a) compressing a first flow of air so as to produce a flow of compressed air;
    b) separating a second flow of air into at least a flow of nitrogen and a flow of oxygen;
    c) combining said flow of compressed air and said flow of oxygen so as to produce a flow of oxygen enriched air;
    d) directing said flow of oxygen enriched air to a gasifier and combusting said solid fuel therein so as to produce a flow of hot gaseous fuel containing particulate matter;
    e) cooling said flow of hot gaseous fuel by transferring heat from said flow of hot gaseous fuel to at least a portion of said flow of nitrogen so as to produce a flow of cooled gaseous fuel; and
    f) directing said cooled gaseous fuel to a filter and removing a substantial portion of said particulate matter therefrom so as to produce a flow of cleaned cooled gaseous fuel.

2. The method according to claim 1, wherein said flow of hot gaseous fuel produced in said gasifier contains slag, and further comprising the step of separating a substantial portion of said slag from said hot gaseous fuel.

3. The method according to claim 2, further comprising the step of directing at least a portion of said slag separated from said hot gaseous fuel to said filter so as to form a filter bed therein, and wherein the step of removing a substantial portion of said particulate matter from said cooled gaseous fuel comprises flowing said cooled gaseous fuel through said filter bed formed by said slag.

4. The method according to claim 3, further comprising the step of cooling said portion of said slag prior to the step of directing said portion of said slag to said filter.

5. The method according to claim 3, wherein said slag is in the form of pieces when separated from said hot gaseous fuel, and further comprising the step of segregating said slag pieces by size prior to directing said portion of said slag to said filter.

6. The method according to claim 5, wherein said portion of said slag directed to said filter consists substantially of slag pieces having a size at least as great as a predetermined minimum size.

7. The method according to claim 6, wherein said predetermined minimum size of said slag pieces is approximately ½ cm.

8. The method according to claim 3, further comprising the step of forming at least said portion of said slag directed to said filter into pellets prior to directing said portion to said filter.

9. The method according to claim 3, wherein the step of separating at least said portion of said slag from said flow of hot gaseous fuel comprises impacting said hot gaseous fuel against a collector plate.

10. The method according to claim 3, wherein the step of separating at least said portion of said slag from said flow of hot gaseous fuel comprises cycloning said flow of hot gaseous fuel.

11. The method according to claim 1, wherein the step of transferring heat from said flow of hot gaseous fuel to at least said portion of said flow of nitrogen comprises mixing at least said portion of said flow of nitrogen into said flow of hot gaseous fuel.

12. The method according to claim 11, wherein the step of mixing said nitrogen into said flow of hot gaseous fuel comprises mixing sufficient nitrogen to cool said flow of hot gaseous to a temperature no greater than 760° C.

13. The method according to claim 1, wherein the flow rate of said flow of oxygen combined with said flow of compressed air is sufficient to raise the oxygen content of said flow of oxygen enriched air to approximately 40% by volume.

14. The method according to claim 1, wherein the flow rate of said flow of oxygen combined with said flow of compressed air in proportion to the flow rate of said solid fuel is sufficient to increase the equivalence ratio in said gasifier to at least about 2.

15. The method according to claim 1, wherein said solid fuel is coal.

16. A system for generating a gaseous fuel from a solid fuel, comprising:
    a) a compressor for compressing a first flow of air so as to produce a flow of compressed air;
    b) an oxygen separation unit for separating a second flow of air into at least a flow of nitrogen and a flow of oxygen;
    c) a gasifier for combusting said solid fuel in a combined flow of said compressed air and said oxygen so as to produce a flow of hot gaseous fuel containing particulate matter;
    d) a cooler having means for cooling said flow of hot gaseous fuel by transferring heat from said flow of hot gaseous fuel to at least a portion of said flow of nitrogen so as to produce a flow of cooled gaseous fuel; and
    e) a filter connected to receive said cooled gaseous fuel from said cooler, said filter having means for removing a substantial portion of said particulate matter from said cooled gaseous fuel so as to produce a flow of cleaned cooled gaseous fuel.

17. The system according to claim 16, wherein said flow of hot gaseous fuel produced in said gasifier contains slag, and further comprising a separator for separating a substantial portion of said slag from said hot gaseous fuel.

18. The system according to claim 17, wherein said means for removing particulate matter comprises a bed media comprised of at least a portion of said slag separated from said hot gaseous fuel.

19. The system according to claim 16, wherein said means for cooling comprises a mixer for mixing at least said portion of said flow of nitrogen into said flow of hot gaseous fuel.

\* \* \* \* \*